(12) United States Patent
Bennett et al.

(10) Patent No.: US 9,272,774 B2
(45) Date of Patent: Mar. 1, 2016

(54) LANDING GEAR BOGIE BEAM WITH JACKING DOME

(75) Inventors: Ian R Bennett, Gloucestershire (GB); Matthew Craig Sexton, Gloucestershire (GB)

(73) Assignee: Messier-Dowty Limited (GB)

( * ) Notice: Subject to any disclaimer, the term of this patent is extended or adjusted under 35 U.S.C. 154(b) by 212 days.

(21) Appl. No.: 13/883,523

(22) PCT Filed: Oct. 28, 2011

(86) PCT No.: PCT/GB2011/052108
§ 371 (c)(1),
(2), (4) Date: Jul. 17, 2013

(87) PCT Pub. No.: WO2012/059742
PCT Pub. Date: May 10, 2012

(65) Prior Publication Data
US 2013/0327889 A1   Dec. 12, 2013

(30) Foreign Application Priority Data
Nov. 4, 2010   (GB) .................................. 1018630.2

(51) Int. Cl.
*B64C 25/52*   (2006.01)
*B64C 25/00*   (2006.01)
*B64C 25/34*   (2006.01)

(52) U.S. Cl.
CPC .............. *B64C 25/001* (2013.01); *B64C 25/34* (2013.01)

(58) Field of Classification Search
None
See application file for complete search history.

(56) References Cited

U.S. PATENT DOCUMENTS

| | | | | |
|---|---|---|---|---|
| 3,042,130 | A * | 7/1962 | Wiebe | 180/14.1 |
| 5,505,250 | A * | 4/1996 | Jago | 164/516 |
| 5,743,491 | A * | 4/1998 | Meneghetti | 244/104 FP |
| 6,173,920 | B1 * | 1/2001 | Meneghetti | 244/100 R |
| 8,181,908 | B2 * | 5/2012 | Mauran et al. | 244/99.4 |
| 8,651,417 | B2 * | 2/2014 | Hilliard et al. | 244/100 R |
| 8,943,840 | B2 * | 2/2015 | Williams | 60/796 |
| 2012/0256050 | A1 * | 10/2012 | Hilliard et al. | 244/100 R |

FOREIGN PATENT DOCUMENTS

| | | |
|---|---|---|
| CN | 2707619 | 7/2005 |
| DE | 3623005 | 1/1988 |
| EP | 0252428 | 1/1988 |
| EP | 0713826 | 5/1996 |
| GB | 794034 | 4/1958 |
| RU | 1352849 | 7/1996 |

OTHER PUBLICATIONS

Notice of the First Office Action, The State Intellectual Property Office of The People's Republic of China, Chinese Patent Application No. 201180052185.5, Applicant: Messier-Dowty Limited, Nov. 24, 2014, pp. 1-8.

* cited by examiner

*Primary Examiner* — Medhat Badawi
(74) *Attorney, Agent, or Firm* — RatnerPrestia

(57) ABSTRACT

An aircraft landing gear assembly comprising a bogie beam (2), an axle (4) extending through the bogie beam and a jacking dome fitting (6) extending through a sidewall (8) of the bogie beam and arranged to transfer vertical loads applied to the jacking dome fitting to the axle.

10 Claims, 5 Drawing Sheets

LANDING GEAR BOGIE BEAM WITH JACKING DOME

This application is filed under 35 U.S.C. §371 as a National Phase of International Application No. PCT/GB2011/052108, which was filed on Oct. 28, 2011 and which claims priority to GB 1018630.2, filed on Nov. 4, 2010.

Larger commercial and military aircraft typically have main landing gear arrangements that include a bogie beam carrying multiple wheel axles and wheels, the bogie beam typically being pivotally attached to one end of a telescopic strut. From time to time it is necessary to jack up the bogie beam whilst the aircraft is on the ground, typically to allow individual wheels to be replaced, for example in the case of the aircraft having suffered a blow-out during landing. The current technical standards stipulate that the bogie beam includes one or more jacking domes that are of a particular shape to engage with a correspondingly shaped jacking pad on the jacking trolley used to jack up the landing gear.

A conventional arrangement for the jacking dome is for the dome to be formed integrally with the metal alloy bogie beam, typically at either end below the axles. However, with larger aircraft of greater weight and passenger/freight capacity high localised stresses can result in the bogie beam whilst jacking the aircraft with the localised stresses potentially exceeding the safe stress loadings of the bogie beam material.

A conventional alternative would be to use a separate steel jacking dome bolted through the bottom surface of the bogie beam. However this introduces other problems. When loaded, i.e. whilst jacking the aircraft, the area around the jacking dome becomes highly stressed with a tendency for the bottom of the bogie beam to deform inwards. This is exacerbated by having to have a hole through the bogie for a separate jacking dome. The bolted jacking dome attachment must be sufficiently wide and deep such that it can transfer the loads from the jacking dome fitting into the bogie. Additionally, the jacking dome fitting must be stable against side loadings. The bogie beam may be strengthened but this either locally reduces the bore of the bogie, making machining more difficult, or requires extra material on the outside of the bogie, reducing ground clearance (which in extreme circumstances may result in it not being possible to place a jack under the jacking dome) and may require an increase in the size of the bogie beam forging.

According to a first aspect of the present invention there is provided an aircraft landing gear assembly comprising a bogie beam, an axle extending through the bogie beam and a jacking dome fitting extending through a sidewall of the bogie beam and arranged to be in contact with the axle during jacking so as to transfer vertical loads applied to the jacking dome fitting directly to the axle.

Additionally, the bogie beam sidewall may include a region of increased thickness through which the jacking dome fitting extends and which is arranged to react lateral loadings applied to the jacking dome fitting. Additionally, the region of increased thickness may be either integrally formed in the bogie beam sidewall or may comprise a separate element secured to the bogie beam sidewall.

Additionally or alternatively, the jacking dome fitting is preferably biased into contact with the axle. The jacking dome fitting may be secured to one end of an elongate resilient element, the elongate resilient element biasing the jacking dome fitting into contact with the axle. Alternatively, one or more wedge elements may be located between a portion of the jacking dome fitting and the bogie beam sidewall, thereby urging the jacking dome fitting into contact with the axle. In a further alternative, the jacking dome fitting may include a threaded collar in engagement with a threaded portion of the jacking dome fitting and in engagement with the bogie beam sidewall, whereby the threaded collar urges the jacking dome fitting into contact with the axle.

In a further embodiment the jacking dome fitting may comprise a further portion in mechanical engagement with the axle, whereby lateral loads applied to the jacking dome fitting are transmitted to the axle. The further portion may encircle a region of the axle and the further portion and the axle may include aligned recesses arranged to receive a locking spigot pin.

Embodiments of the present invention are described below as non-limiting examples with reference to the accompanying figures, of which:

Figure 3:
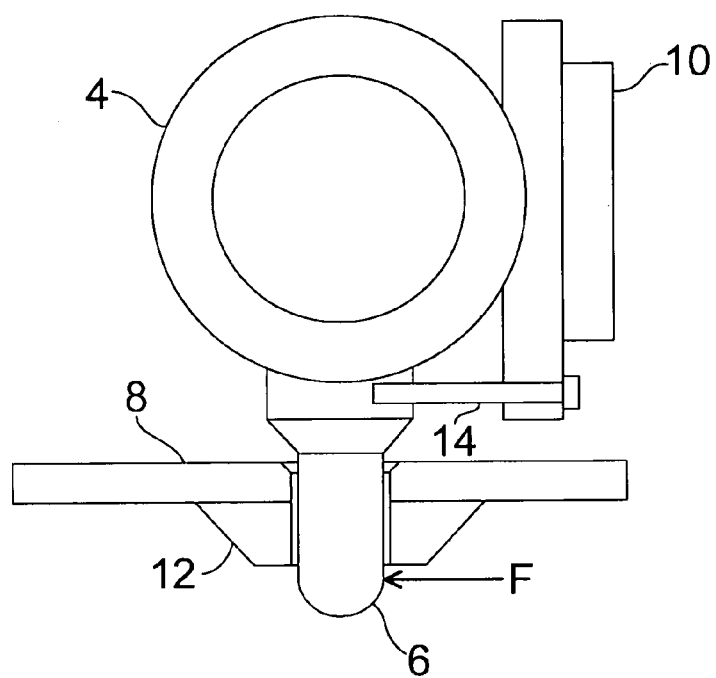
Figure 4:
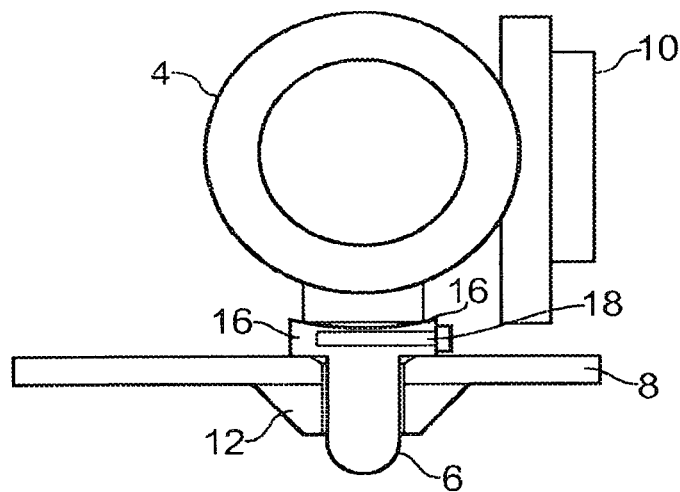
Figure 5:
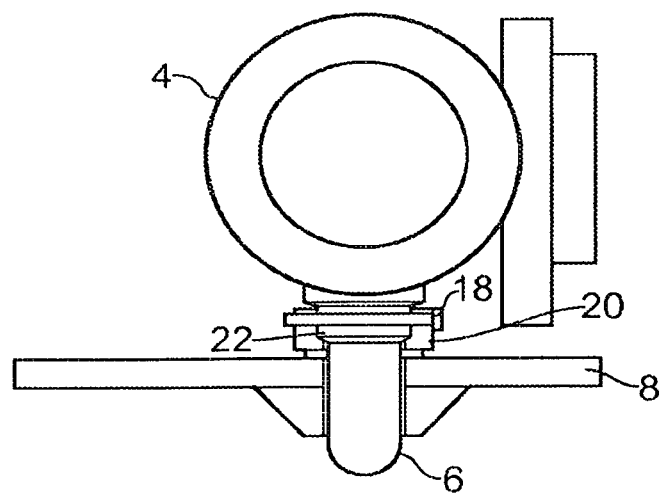
Figure 6:
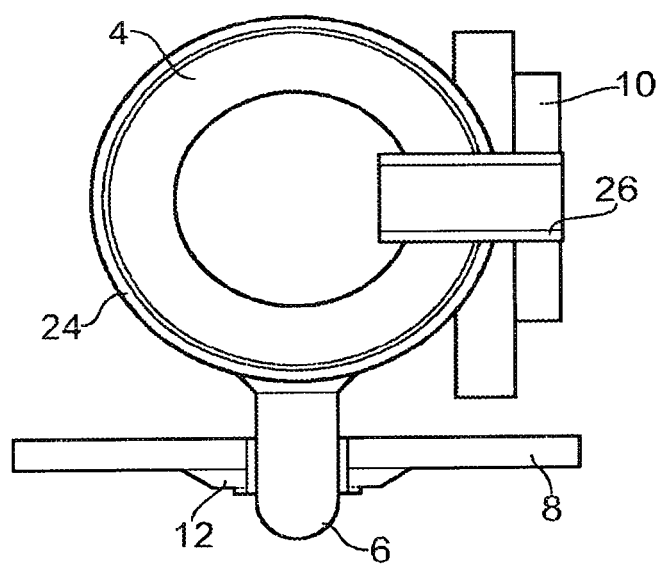
Figure 7:
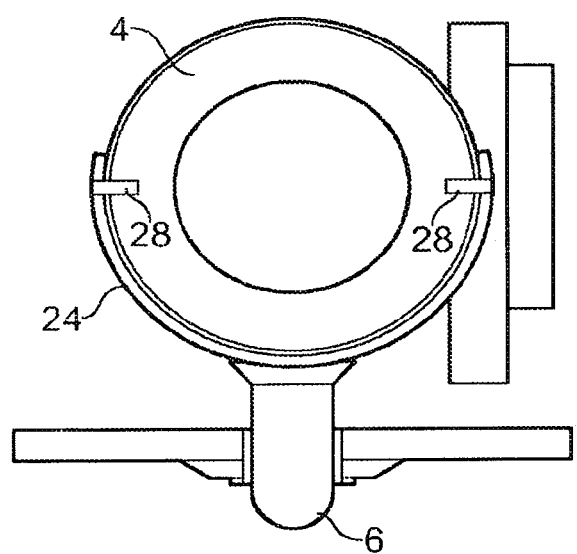

FIG. 3 schematically illustrates a jacking dome fitting according to a first embodiment of the present invention;

FIG. 4 schematically illustrates a jacking dome fitting according to a second embodiment of the present invention;

FIG. 5 schematically illustrates a jacking dome fitting according to a third embodiment of the present invention;

FIG. 6 schematically illustrates a further embodiment of the present invention; and FIG. 7 shows a further variation of the embodiment of the present invention shown in FIG. 6.

Figure 1:
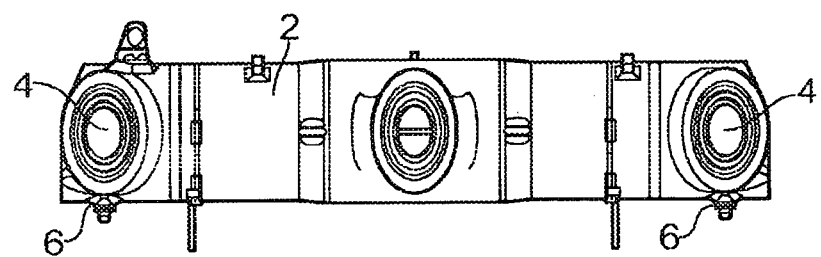
FIG. 1 shows a bogie beam having twin axles and jacking domes according to the prior art.
Figure 2:
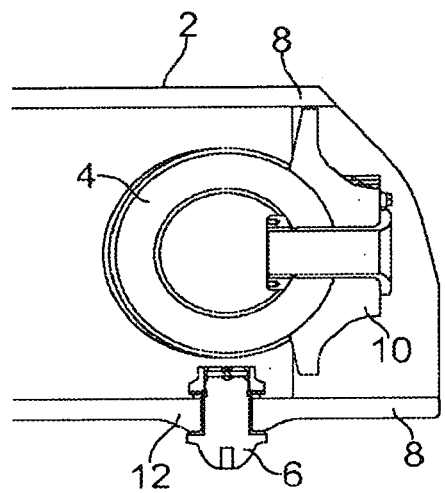
FIG. 2 is a partial cross-section through the bogie beam of FIG. 1 showing a separate jacking dome fitting according to the prior art.

FIG. 1 shows a side view of a bogie beam with twin axles known from the prior art. The bogie beam 2 has an axle 4 located at either end of the bogie beam. Located below each of the axles 4 are individual jacking domes 6. FIG. 2 shows a simplified cross-section through one end of the bogie beam, axle and jacking dome. The bogie beam 2 is a hollow body defined by a sidewall 8. The axle 4 is located and secured to the bogie beam sidewall 8 by means of an end fitting 10 typically referred to as a diaphragm. Immediately below the axle 4 a separate jacking dome 6 is located through a hole formed in the sidewall 8 of the bogie beam. As can be seen from FIG. 2, the region of the bogie beam sidewall 8 immediately adjacent to the hole through which the jacking dome 6 passes has a localised thickness greater than the remainder of the sidewall 8, thus forming a socket 12 that has to carry both the vertical loads arising during jacking of the landing gear and any lateral loads applied to the jacking dome. Consequently, the socket 12 experiences high local stresses.

FIG. 3 schematically illustrates a first embodiment of the present invention, in similar cross-section to FIG. 2. In a similar manner to the prior art arrangement shown in FIG. 2, the embodiment of the present invention shown in FIG. 3 includes an axle 4 located and secured to the sidewall 8 of a bogie beam by means of a diaphragm 10. A separate jacking dome fitting 6 passes through a hole formed in the bogie beam sidewall 8, such that one end of the jacking dome fitting presents a conventional jacking dome for engagement with conventional jacking apparatus. However, in contrast to the prior art the opposite end of the jacking dome fitting extends into the interior cavity of the bogie beam, extending into contact with the axle 4. Preferably, the end of the jacking dome fitting in contact with the axle is shaped in a complimentary manner to the axle to provide a large contact area. A socket 12 is formed in the sidewall 8 of the bogie beam surrounding the jacking dome fitting, the socket either being formed integrally with the sidewall 8 of the bogie beam or as an additional element attached to the exterior of the bogie beam sidewall.

As a consequence of the jacking dome fitting extending through the bogie beam sidewall and into contact with the axle 4, the vertical loads applied to the jacking dome during jacking operations are transferred directly into the axle 4, rather than into the bogie beam, as in the prior art. The axle 4 has a stiffer local section than the bogie beam and therefore the localised stresses caused by the vertical loads are not as great as would otherwise be experienced by the bogie beam. In the embodiment shown in FIG. 3, any lateral loadings applied to the jacking dome are transferred, or reacted, through the socket 12 formed in the sidewall 8 of the bogie beam. However, since the socket is only required to react the lateral loads and is no longer to react the vertical loads, the localised stress induced in the bogie beam by the lateral loads only is significantly less than the combined lateral and vertical loadings seen by the bogie beams of the prior art.

In the particular embodiment illustrated in FIG. 3, the jacking dome fitting 6 is biased into contact with the axle 4 by means of a retaining bolt 14 that functions as a cantilever spring to preload the jacking dome fitting against the axle 4. It is preferable for the jacking dome fitting to be biased into contact with the axle to reduce the risk of fretting (wear caused to either the jacking dome fitting or axle caused by relative movement between the two parts) or to avoid corrosion arising from moisture ingress between the axle and jacking dome fitting. As illustrated in FIG. 3, the retaining bolt 14 secures the jacking dome fitting 6 to the diaphragm 10.

Alternatively the retaining bolt may be used as a cantilever spring to bias the jacking dome fitting into an unloaded position with a positive clearance with the axle, in order to avoid fretting. The resilience would be such that the jacking dome fitting comes into contact with the axle when loaded by a jack.

A further embodiment of the present invention is also schematically illustrated in FIG. 4. The generally arrangement of the parts is as illustrated and described with reference to FIG. 3. However, in place of the cantilever spring retaining bolt 14 of FIG. 3, in the embodiment shown in FIG. 4 a number of individual wedges 16 are located between the inner face of the bogie beam sidewall 8 and a flanged portion of the jacking dome fitting 6. The wedges 16 may, for example, comprise semicircular wedge sections located around the periphery of the jacking dome fitting 6. A retaining bolt 18 allows the wedges 16 to be urged towards one another, thereby exerting a corresponding bias force on the jacking dome fitting 6 to bias the fitting into contact with the axle 4.

A further arrangement for biasing the jacking dome fitting into contact with the axle 4 is illustrated in FIG. 5. In this embodiment the jacking dome fitting 6 includes a threaded portion 22 located in the interior space of the bogie beam. In threaded engagement with this threaded portion 22 is a threaded collar 20. To bias the jacking dome fitting 6 against the axle the threaded collar 20, which may for example be a conventional threaded nut, is rotated such that it bears against the inner surface of the bogie beam sidewall 8 and imparts a resulting translational force to the jacking dome fitting 6 to bias the fitting into contact with the axle 4. A locking bolt 18 may additionally be provided to secure the locking collar into place once assembly of the jacking dome, axle and bogie beam assembly is complete.

All of the embodiments described above with reference to FIGS. 3-5 include a socket 12 through which the jacking dome fitting 6 passes that is of sufficient thickness that it can react a moment to support the jacking dome when lateral loads are applied. In certain circumstances the dimensions of the socket may be undesirably large. In these circumstances an alternative mechanism for reacting lateral loads applied to the jacking dome is required. FIG. 6 schematically illustrates an embodiment of the present invention in which the lateral loads are no longer reacted solely by the socket. In the embodiment illustrated in FIG. 6 the jacking dome fitting 6 includes a further portion 24 that substantially encircles the outer circle of the axle 4. Corresponding recesses are formed in the axle and further portion 24 of the jacking dome fitting through which a spigot pin 26 is located, the spigot pin also being located in a corresponding recess in the diaphragm 10, thus interlocking the further portion 24 of the jacking dome fitting 6 to the axle 4. The recesses in the jacking dome fitting and the axle 4 through which the spigot pin is located are arranged to be in the region of the neutral axis of the axle where localised stresses are less critical. Consequently, any transverse loads applied to the jacking dome 6 are reacted through the axle 4 via the further portion 24 of the jacking dome fitting and consequently the socket 12 no longer has to react a moment but simply acts as a lug with a simple shear load that can be made much thinner than for the previously discussed embodiments. In an alternative arrangement the further portion 24 of the jacking dome fitting may be replaced with a band-clamp arrangement that may be clamped sufficiently tight enough such that the friction generated between the band-clamp and the axle 4 provides an adequate load transfer path into the axle 4, allowing the spigot 26 to be dispensed with.

A further variation of this embodiment is illustrated in FIG. 7 in which the further portion 24 of the jacking dome fitting 6 have one or more protrusions 28 formed thereon that are arranged to be located within correspondingly shaped recesses formed in the axle 4, thus mechanically engaging the jacking dome fitting with the axle and providing the necessary load transfer path. As with the embodiment illustrated in FIG. 6, the projections 28 and corresponding recesses formed in the axle 4 are located near the neutral axis of the axle to minimise local stresses.

The illustrated embodiments of the present invention therefore provide an aircraft landing gear assembly including a jacking dome fitting that is arranged to transfer vertical jacking loads directly to an axle within the landing gear assembly, rather than the bogie beam itself, thus reducing the localised stresses induced in the bogie beam sidewall.

The invention claimed is:

1. An aircraft landing gear assembly comprising a bogie beam, an axle extending through the bogie beam and a jacking dome fitting extending through a sidewall of the bogie beam and arranged to be in contact with the axle during jacking so as to transfer vertical loads applied to the jacking dome fitting directly to the axle.

2. The aircraft landing gear assembly according to claim 1, wherein the bogie beam sidewall includes a region of increased thickness through which the jacking dome fitting extends and which is arranged to react lateral loadings applied to the jacking dome fitting.

3. The aircraft landing gear assembly according to claim 2, wherein the region of increased thickness is either integrally formed in the bogie beam sidewall or comprises a separate element secured to the bogie beam sidewall.

4. The aircraft landing gear assembly according to claim 1, wherein the jacking dome fitting is biased into contact with the axle.

5. The aircraft landing gear assembly according to claim 4, wherein the jacking dome fitting is secured to one end of an elongate resilient element, the elongate resilient element biasing the jacking dome fitting into contact with the axle.

6. The aircraft landing gear assembly according to claim 4, wherein one or more wedge elements are located between a portion of the jacking dome fitting and the bogie beam sidewall, thereby urging the jacking dome fitting into contact with the axle.

7. The aircraft landing gear assembly according to claim 4, wherein the jacking dome fitting includes a threaded collar in engagement with a threaded portion of the jacking dome fitting and in engagement with the bogie beam sidewall, whereby the threaded collar urges the jacking dome fitting into contact with the axle.

8. The aircraft landing gear assembly according to claim 1, wherein the jacking dome fitting is biased away from the axle when said jacking dome fitting is not loaded by a jack.

9. The aircraft landing gear assembly according to claim 1, wherein the jacking dome fitting comprises a further portion in mechanical engagement with the axle, whereby lateral loads applied to the jacking dome fitting are transmitted to the axle.

10. The aircraft landing gear assembly according to claim 9, wherein the further portion encircles a region of the axle, and the further portion and the axle include aligned recesses arranged to receive a locking spigot pin.

\* \* \* \* \*